United States Patent
Maire

(10) Patent No.: US 8,423,234 B2
(45) Date of Patent: Apr. 16, 2013

(54) DEVICE FOR MEASURING THE MOVEMENT OF A SELF-GUIDED VEHICLE

(75) Inventor: Alain Maire, Montigny le Bretonneux (FR)

(73) Assignee: Siemens SAS, St. Denis (FR)

( * ) Notice: Subject to any disclaimer, the term of this patent is extended or adjusted under 35 U.S.C. 154(b) by 338 days.

(21) Appl. No.: 12/747,339

(22) PCT Filed: Dec. 10, 2007

(86) PCT No.: PCT/FR2007/002030
§ 371 (c)(1),
(2), (4) Date: Sep. 2, 2010

(87) PCT Pub. No.: WO2009/074724
PCT Pub. Date: Jun. 18, 2009

(65) Prior Publication Data
US 2010/0324776 A1    Dec. 23, 2010

(51) Int. Cl.
*G06F 7/00* (2006.01)
(52) U.S. Cl.
USPC .......................... 701/31.4; 701/23
(58) Field of Classification Search ............ 701/31.4, 701/30.5, 30.8, 30.9, 31.1, 31.2, 19, 20, 23, 701/34.3, 29.1
See application file for complete search history.

(56) References Cited

U.S. PATENT DOCUMENTS

| | | | |
|---|---|---|---|
| 2002/0088904 A1 | 7/2002 | Meyer | |
| 2003/0040849 A1* | 2/2003 | Hathout et al. | 701/1 |
| 2005/0137761 A1 | 6/2005 | Lungu | |

FOREIGN PATENT DOCUMENTS

| | | | |
|---|---|---|---|
| DE | 2813078 B | 4/1979 | |
| DE | 2813078 B1 * | 4/1979 | |
| DE | 102005001403 A1 | 7/2006 | |
| EP | 0716001 A1 | 6/1996 | |

* cited by examiner

*Primary Examiner* — Thomas Black
*Assistant Examiner* — Marthe Marc-Coleman
(74) *Attorney, Agent, or Firm* — Laurence A. Greenberg; Werner H. Stemer; Ralph E. Locher

(57) ABSTRACT

The invention relates to a device for measuring the movement of a self-guided vehicle, that comprises onboard thereof: at least one accelerometer provided with a measurement axis arranged in the longitudinal direction of a potential main rectilinear movement of the vehicle, a first tachometer provided on an axle upstream from the vehicle in the longitudinal direction, a second tachometer provided on a second axle downstream from the vehicle in the longitudinal direction, wherein measure signals from the accelerometer and from the first and second tachometers are supplied to a computing unit. Accordingly, it is advantageously possible to determine the speed and the position of the vehicle on a vehicle route while taking into account an adhesion loss of at least one of the axles as well as an exact slope and turn effect on a vehicle route that does not remain rectilinear and changes horizontally and/or vertically.

10 Claims, 2 Drawing Sheets

DEVICE FOR MEASURING THE MOVEMENT OF A SELF-GUIDED VEHICLE

BACKGROUND OF THE INVENTION

Field of the Invention

The present invention relates to a device for measuring the movement of a self-guided vehicle which carries, on-board, at least one accelerometer with a measurement axis in the longitudinal direction of a main movement of the vehicle, assumed to be rectilinear, a first tachometer provided on an axle upstream from the vehicle in the longitudinal direction, and a second tachometer provided on a second axle downstream from the vehicle in the longitudinal direction.

Numerous methods or devices for measuring movement, speed or acceleration of a vehicle are known nowadays, in particular for vehicles intended for public transport such as a carriage of a train, of a metro train, a trolleybus, a tramway car, a bus or any other vehicle driven in traction by at least one guide rail. In particular, in the case of a vehicle which is self-guided by a traffic system (railway signals, onboard and/or remote autopilot system of the vehicle, etc.), measures to provide self-guidance which is reliable (against breakdown) and safe (for the passengers or goods) are indispensable whatever the nature of the route of the vehicle. In this sense, it is essential to be accurately informed in real time about the position, the speed (and the acceleration) of the vehicle, in particular in situations where the vehicle incurs unavoidable loss of adhesion, such as during slipping (during acceleration/traction of the vehicle) or locking (during braking of the vehicle) of an axle/wheel.

When the guided vehicle has an axle which is free of any tractive or braking force, the movement of the vehicle is directly provided by the rotation of the axle (or one of the wheels associated with this axle).

However, this solution reduces the tractive or braking power and thus the performance of the vehicle, and this is why the majority of systems do not have free-running axles.

In the absence of a free-running axle and to overcome the consequences associated with slipping/wheel locking, with adhesion loss of one of its wheels, several devices exist and use:

either measuring means which are completely independent of the wheels permitting a measurement of speed by optical means or even by means of a Doppler effect radar system. These costly devices generally use, however, an additional tachometer for operation at low speed and when the vehicle is stationary, said tachometer making it possible to obtain the angular speed of a wheel or the number of revolutions of the wheel per unit of time;

or inertial units combining accelerometers, gyrometers and terrestrial localization systems such as a GPS. Said systems, however, remain very costly due to their high-level technology, frequently used in applications for aeronautical systems;

or, as in EP 0 716 001 B1, a single tachometer arranged on an axle and a means for taking into account a safety margin for the values measured on one wheel or on the wheels in order to attempt to compensate for the effects of possible slipping/wheel locking which impairs the performance for measuring movement as it still remains too approximate. This also results in an anti-lock system as compensation which may be very abrupt for a vehicle and its passengers or goods. In particular, the transportation ability is reduced whether slipping has taken place or not, as the dimensioning of the system has to take into account a sufficient margin for compensating everywhere/permanently. Controlling or guiding the vehicle using this single measure which does not have a sufficient range for the wheel locking, effectively impairs the accuracy of monitoring the speed program and the stopping accuracy. This also results in a reduction in performance in terms of transportation ability and stopping accuracy of the system;

or, as in US 2005/0137761 A1, an accelerometer fitted in the vehicle and a tachometer on an axle, the measurement signals of which are linked to an appropriate central computer, even if not specifically disclosed, to take into account errors which occur in the event of adhesion loss and providing the speed and the position of the vehicle on its route. In particular, the accelerometer comprises two measurement axes in order respectively to determine an acceleration in one direction of the trajectory of the vehicle and in order to determine and thus take into account, in the calculation of movement, a slope of the vehicle relative to a horizontal plane. Values of the measurement signals of the accelerometer and of the tachometer are also compared to threshold speed values which, if they exceed a threshold, make it possible to indicate the presence of adhesion loss (slipping/wheel locking) of the vehicle. Although the effects of slope sustained by the vehicle are taken into account, other effects associated with the trajectory of the vehicle are unavoidable depending on the position of the accelerometer (and of the positioning of the two measurement axes thereof) in the vehicle, as a railway transport unit frequently has an elongate geometry along which a single accelerometer and a tachometer placed upstream of the vehicle may not provide a measurement means which shows the effects acting on the complete assembly of the vehicle such as, for example, the effects of turn or lateral acceleration.

All these devices make it possible, therefore, to calculate the movement of a guided vehicle which does not have axles which are free of any braking and tractive force, and which runs on a track of any profile but with an accuracy which is much lower than that of an "ideal" system with a free-running axle, as they may not completely overcome adhesion losses (slipping and wheel locking caused by tractive/braking forces) in addition to errors caused by lateral acceleration, and even vertical acceleration.

BRIEF SUMMARY OF THE INVENTION

One object of the present invention is to propose a device for measuring the movement of a self-guided vehicle having enhanced measuring reliability in the event of an adhesion loss.

Based on a device for measuring the movement of a self-guided vehicle, that comprises on-board thereof:
at least one accelerometer provided with a measurement axis arranged in the longitudinal direction of a potential main rectilinear movement of the vehicle,
a first tachometer provided on an axle upstream from the vehicle in the longitudinal direction,
a second tachometer provided on a second axle downstream from the vehicle in the longitudinal direction,
measurement signals from the accelerometer and from the first and second tachometers being supplied to a computing unit, it is advantageously possible to determine the speed and the position of the vehicle on its route while taking into account an adhesion loss of at least one of the axles (free-running axle or drive axle) as well as an exact slope and turn effect on the vehicle route that does not remain rectilinear but changes horizontally and/or vertically.

In contrast with the devices disclosed in the prior art and by means of the computing unit, said device may detect the start of an adhesion loss in two possible complementary ways:

either by way of a detection means based on varying the measurement signal of one of the two on-board tachometers positioned in separate locations of the trajectory of the vehicle, for example on both sides of the vehicle in its longitudinal direction of movement, or by way of a detection means based on a relative differential measurement of the measurement signals from the two tachometers. In addition, in order to detect a time interval where the so-called adhesion loss takes place until the end thereof, the second differential detection mode may be preferred to the first.

It is also noteworthy here that the duplication of the tachometer considerably improves the self-guidance of the vehicle in the sense of reliability (redundancy provided in the case of breakdown of one of the tachometers) and in the sense of safety (measurement and detection of adhesion loss which is better distributed over the vehicle for the comfort and safety of the passengers or/and for the stability of the goods in the event of active compensation of the slipping/wheel locking by an automatic driving system (self-guidance) of the vehicle and no longer by another separate anti-lock device). This aspect is particularly well suited to the characteristics (slope, turn, portion of iced/worn track, etc.) of the route of the vehicle of elongate geometry.

Advantageously, the accelerometer may also comprise just one measurement axis (for example aligned with the trajectory of the vehicle which might be displaced in a straight line) which makes it possible to determine a longitudinal-type acceleration over the route of the vehicle. Said accelerometer, therefore, remains simple and thus reliable and less costly than accelerometers provided with a plurality of measurement axes. According to this system and in order to be able to compensate for the effects of slope, turn or other factors influencing the measurement of effective acceleration (in addition to speed and position by means of integration) of the vehicle on its route, the device according to the invention may dispense with other measurement axes of the accelerometer, in that:

it uses a position measurement system (data bank coupled to simple marker means on the ground or overhead) providing data of a profile of the trajectory of the vehicle such as at least one slope and one turn (or an inclination according to the lateral orientation of the vehicle) at each position of the vehicle in motion, the accelerometer provided with a measurement axis thus provides only one measurement of the total acceleration of the vehicle, a computer then processes the data of the profile of the trajectory and total acceleration measured in order to determine an acceleration which has been corrected according to the longitudinal direction of movement of the vehicle for which the effects of slope and turn influencing the behavior of the vehicle in motion are accurately taken into account and thus also of the accelerometer which is fixed thereto.

It is noteworthy that the slope and turn data represent data which do not need to be precise or redefined for each meter covered by a railway transport means, as their values change slowly. This makes it possible, therefore, to use a smaller data bank source as slope/turn parameters, i.e. a simple and reliable system which nevertheless will not reduce in any way the accuracy of the measurement of the movement.

A set of sub-claims also presents advantages of the invention.

Exemplary embodiments and exemplary applications of the invention are provided with reference to the figures described, in which:

DESCRIPTION OF THE INVENTION

Figure 1:
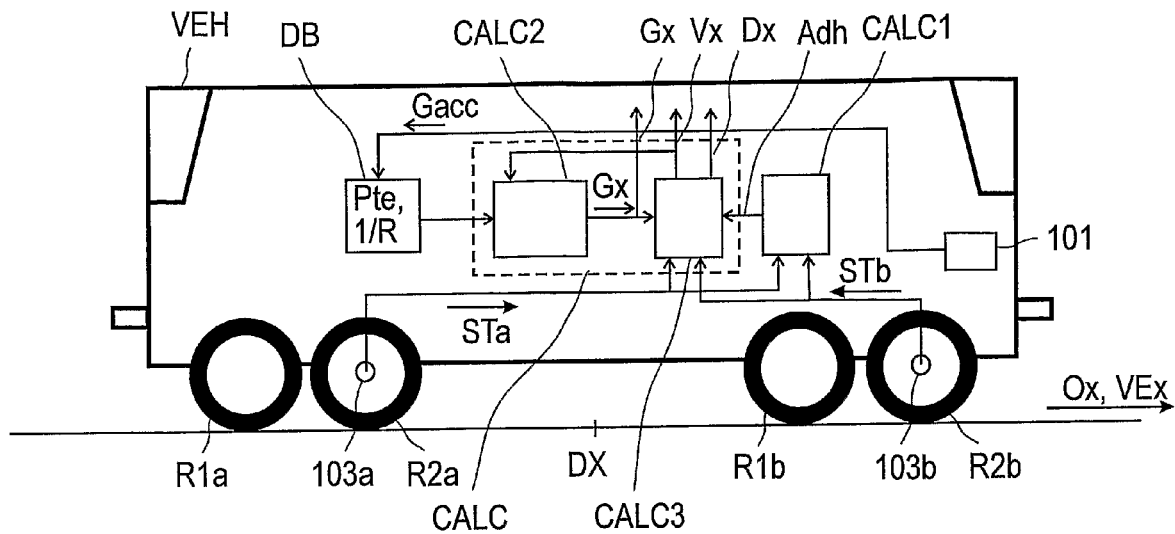
FIG. 1 shows a vehicle provided with a device for measuring the movement of the self-guided vehicle according to the invention.

FIG. 1 shows a vehicle VEH provided with a device for measuring the movement of the self-guided vehicle according to the invention. The vehicle VEH comprises in this case two bogies each comprising one pair of axles R1$a$, R2$a$, R1$b$, R2$b$, of which at least one of the two axles R2$a$, R2$b$ upstream and downstream of the vehicle VEH in a longitudinal direction VEx of movement (initially assumed to be simply rectilinear) of the vehicle are respectively provided with a tachometer 103$a$, 103$b$. It is also possible to provide all the axles with tachometers so as to be able to refine the measurement from the tachometers of the same bogie or as a safety measure in the case of an error of one tachometer by means of another tachometer on the same bogie. Similarly, it may be provided that one of the axles of a bogie is free-running whilst the other axle is a drive axle. In the event of use of the vehicle VEH in two opposing directions according to the longitudinal direction VEx of movement of the vehicle, the device comprising the tachometers arranged on both sides of its length permits a tachymetric measurement which is advantageously redundant in both directions. By the same token, a single on-board accelerometer 101 provided with a single measurement axis is nevertheless sufficient for a bi-directional measurement of movement by means of its single measurement axis, as its position in the vehicle is known. It is, however, possible to use a plurality of accelerometers, such as two placed upstream and downstream of the vehicle for the security of redundancy.

As shown by way of an exemplary embodiment, the device for measuring movement of the self-guided vehicle VEH thus comprises on-board thereof:

at least one accelerometer 101 provided with a measurement axis according to the longitudinal direction VEx, corresponding in this case to a movement of the vehicle, assumed to be rectilinear, a first tachometer 103$b$ arranged on an axle upstream from the vehicle in the longitudinal direction VEx, a second tachometer 103$a$ arranged on a second axle downstream from the vehicle in the longitudinal direction VEx, measurement signals Gacc, STb, STa from the accelerometer, of the first and of the second tachometers being supplied to a computing unit CALC, DB, CALC1, CALC2, CALC3.

The instantaneous and cyclical measurement signals STa, STb at the output of the tachometers 103$a$, 103$b$ of at least one of the two axles of the bogies are supplied to a detector of adhesion loss CALC1 (in the event of slipping or wheel locking). The axles may be independently free-running or not free-running (braked and/or motorized). The detector of adhesion loss is thus coupled to the output signals STa, STb of each of the tachometers, and each output signal provides a measurement of the instantaneous angular speed of the associated axle.

The output signals ST, STb of the two tachometers are also supplied to a secondary computer CALC3 provided with a signal input for an indicator Adh for detecting adhesion loss from the detector of adhesion loss CALC1. This coupling of the signal may be used if no adhesion loss is detected in the region of the detector of adhesion loss CALC1. In contrast, in the event of active detection of adhesion loss, the detector of adhesion loss CALC1 makes it possible to activate the indicator Adh, thus indicating a detection according to two types of detection of adhesion loss which may possibly be combined and according to which:

a variation of the instantaneous angular speed (or number of rotational pulses of the wheel per unit of time) of at least one of the output signals STa, STb of the tachometers is detected, in particular in the case of the start of adhesion loss of at least one axle, or/and a difference between the angular speeds (or number of rotational pulses of the wheel per unit of time) of each output signal STa, STb of the tachometers is detected, in particular very accurately in the case of the start of adhesion loss, but also during adhesion loss and until the end of adhesion loss.

In the case of detection of adhesion loss, the device provides that:

a system for position measurement DB supplies data of a profile of the trajectory of the vehicle such as at least one slope Pte and one turn 1/R (but also other possible information such as inclination) at each position DX of the vehicle in motion, the accelerometer 101 provided with a measurement axis provides a measurement of a total acceleration Gacc of the vehicle in the direction VEx of its measurement axis, a computer CALC processes the data of the profile of the trajectory Pte, 1/R and the total acceleration measured Gacc in order to determine a corrected acceleration Gx, now in a longitudinal direction Ox of effective movement of the vehicle for which the effects of slope and turn are taken into account.

In the case of FIG. 1 (as FIG. 2 below, with the effect of slope), the two longitudinal directions Ox, VEx are identical due to the profile views of the vehicle and the physical model presented. In FIG. 3, (viewed from above the vehicle, with the effect of turn), it will become clear that the longitudinal direction Ox of effective movement may differ considerably from the longitudinal direction VEx for a movement assumed to be rectilinear. By extension, the direction VEx may be distinguished from the other direction Ox by the terms "direction VEx" and "effective direction Ox".

In order to describe the invention in simple terms, a possible modular representation of the device has been presented in which the computer CALC comprises:

a primary computer CALC2 provided with signal inputs for the data of the profile of the trajectory Pte, 1/R and for the measured acceleration Gacc in the direction Ox and an output signal for the corrected acceleration Gx in the effective direction VEx, a secondary computer CALC3 provided with a signal input for the indicator Adh for detecting adhesion loss from the detector of adhesion loss CALC1, the secondary computer CALC3 being provided with outputs for supplying an estimated speed Vx and, by conventional integration, an estimated position Dx of the vehicle, the secondary computer CALC3 being provided with inputs for the signals STa, tachometers to estimate the speed Vx and the position Dx of the vehicle (these inputs are necessary if, in parallel with the indicator Adh, the detector of adhesion loss CALC1 does not transmit the signals STa, STb directly to the secondary computer CALC3), the secondary computer CALC3 being provided with a signal input for the corrected acceleration Gx from the primary computer CALC2 in order to re-estimate the speed Vx and the position Dx of the vehicle at least during adhesion loss, for which a previously estimated value of the speed Vx is transmitted from the secondary computer CALC3 to the primary computer CALC2 to carry out a re-estimation of the corrected acceleration Gx.

In this manner, a process for measuring the movement is initiated iteratively, at least from the start of the detection of adhesion loss, even continuously if required. In order to calculate instantaneously the speed Vx and the position Dx during an adhesion loss phase, it is sufficient to store a speed and position value at the start of the detection of adhesion loss and to apply the iterative process of re-estimation of the corrected acceleration Gx from the acceleration Gacc to the measurement axis of the accelerometer 101 by updating the values of speed Vx and position Dx by conventional integration.

Before a detection of adhesion loss and as a default mode, the secondary computer CALC3 may also simply supply the speed Vx and the position Dx of the vehicle by means of dynamic parameters associated with the rotation of at least one of the axles. When an adhesion loss is detected, the secondary computer CALC3 supplies the speed Vx to the primary computer CALC2, said primary computer supplying in return the acceleration Gx to the secondary computer CALC3. The secondary computer CALC3 thus has all the necessary information to re-estimate the speeds Vx and the position Dx in the effective direction VEx.

Although not shown in the figures, the accelerometer may comprise a plurality of separate measurement axes, in order to be able to determine more components of acceleration due, in particular, to the effects of, amongst other things, the slope or the turn. This makes it possible to compensate for a faulty supply of data (slope, turn, etc.) from the system for position measurement DB (for example by a marker means activating a data bank containing the desired data, by GPS (=Geographical Position System), etc.).

Figure 2:
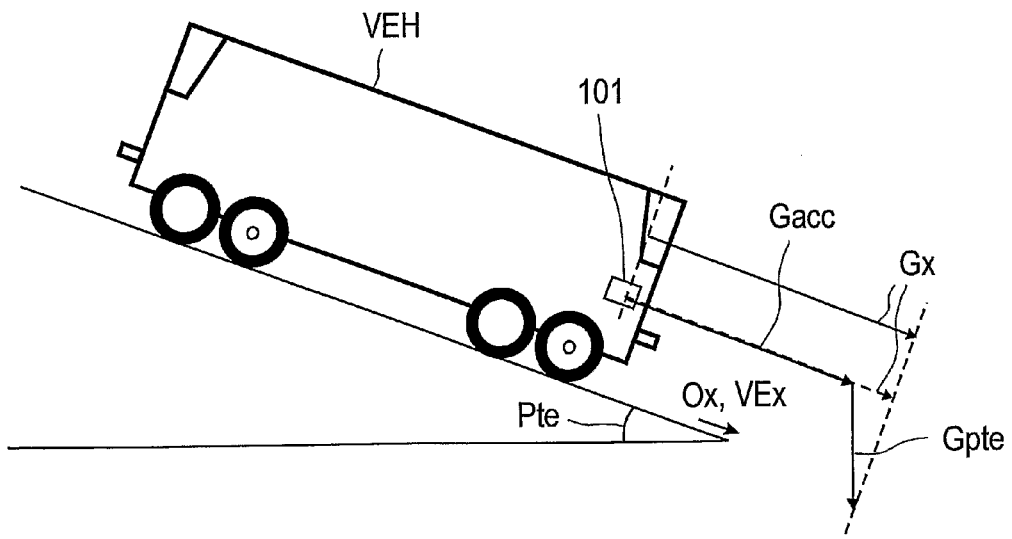
FIG. 2 shows a diagram for taking into account the effect of slope on the device.
Figure 3:
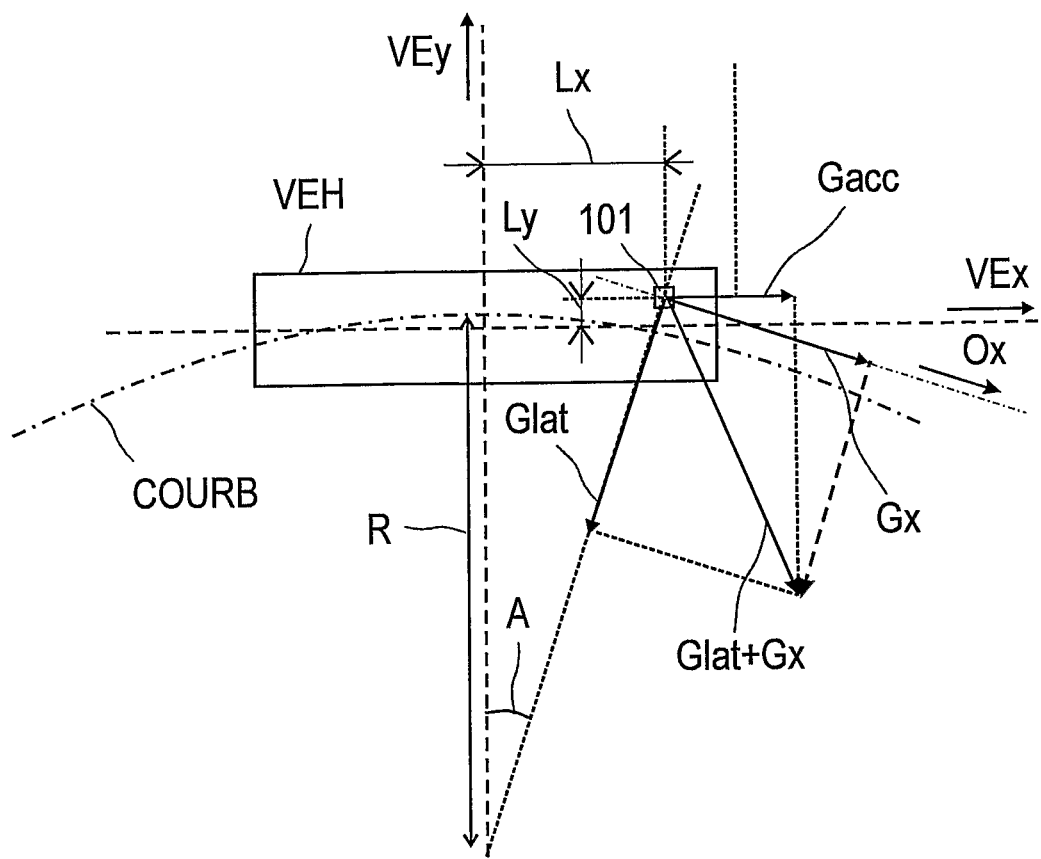
FIG. 3 shows a diagram for taking into account the effect of turn on the device.

FIG. 2 shows a diagram (viewed from the side) for taking into account the effect of slope Pte relative to the horizontal sustained by the vehicle VEH in rectilinear descent, according to FIG. 1. The accelerometer 101 measures the longitudinal acceleration Gacc on its oblique measurement axis (in the rectilinear direction VEx,) due to the slope Pte. The longitudinal acceleration Gacc is actually the sum of the longitudinal acceleration Gx in the effective direction Ox and the acceleration associated with the effect of slope Gpte or gravity. The device according to the invention makes it possible to measure accurately the longitudinal acceleration Gx in the effective direction Ox, and then the speed Vx and the position Dx, as disclosed in FIG. 1.

FIG. 3 shows a diagram (viewed from above) for taking into account the effect of turn 1/R having a radius of curvature R sustained by the vehicle VEH over a laterally curved portion COURB of the route according to FIG. 1. The accelerometer 101 is arranged at a known longitudinal distance Lx (according to the longitudinal direction VEx) and a known lateral distance Ly (according to a direction VEy perpendicular to the longitudinal direction VEx) relative to the center of the vehicle VEH. It is important to remember that this dimensioning factor is significant for taking into account the effect of turn, as according to these distances selected, the effect of turn has a variable degree of influence on the measurement of movement, and at worst, may irremediably falsify it. This is all the more important if the vehicle is assumed to be elongate in its longitudinal direction VEx of movement, as in the case of a railway unit for the transport of passengers.

The accelerometer 101 measures the longitudinal acceleration Gacc on its measurement axis in the rectilinear direction VEx, which is non-tangential to the curve COURB over a radius of curvature passing through the accelerometer 101. The longitudinal acceleration Gacc is actually the sum of the longitudinal acceleration Gx in the effective direction Ox (i.e. tangential to the curve COURB over a radius of curvature passing through the accelerometer 101) and of the acceleration associated with the effect of lateral turn Glat (centrifugal force). The device according to the invention thus makes it possible to measure exactly the longitudinal acceleration Gx in the effective direction Ox, then the speed Vx and the position Dx, as disclosed in FIG. 1.

It is thus possible to describe a method for implementing the device generally used for instantaneous data of slope Pte and turn 1/R, according to which:

the corrected acceleration Gx is the sum of the total measured acceleration Gacc, the acceleration under the effect of slope Gpte and the acceleration under the effect of turn Glat, the acceleration under the effect of slope Gpte is proportional to gravity, the acceleration under the effect of turn Glat is the product of:

a) a sine of an instantaneous angle A of which the apex is at the center of curvature 1/R and of which the sides pass through the center of the vehicle and through the accelerometer, b) and the speed Vx squared and divided by the sum of a radius R of curvature 1/R and a lateral distance Ly of the accelerometer relative to the center of the vehicle, the instantaneous angle A is approximated by a longitudinal distance Lx of the accelerometer relative to the center of the vehicle divided by the sum of the radius of curvature R and the lateral distance Ly of the accelerometer relative to the center of the vehicle, where the longitudinal distance Lx is positive or negative according to whether the accelerometer is arranged upstream or downstream from the vehicle in its direction of movement and the lateral distance Ly is positive or negative according to whether the accelerometer is arranged on the outside or inside of a curve relative to the turn 1/R.

This method may be modeled by the following system of equations (1), (2), (3), (4):

$$Gx = Gacc + Gpte + Glat \quad (1)$$

$$Gpte = Pte \times \text{gravity}(9.81 \text{ m/s2}) \quad (2)$$

$$Glat = (Vx^2/(R+Ly)) \times \text{Sine}(A) \quad (3)$$

$$A = Lx/(R+Ly) \quad (4)$$

What is claimed is:

1. A device for measuring a movement of a self-guided vehicle, comprising, on-board the vehicle:

at least one accelerometer provided with a measurement axis in a longitudinal direction of a main movement of the vehicle, assumed to be rectilinear;

a first tachometer provided on a forward axle of the vehicle in the longitudinal direction;

a second tachometer provided on a rearward axle of the vehicle in the longitudinal direction;

a computing unit connected to receiving measurement signals from said at least one accelerometer, from said first tachometer, and from said second tachometer; and a position measurement system configured to supply, upon detection of an adhesion loss, data of a profile of a trajectory of the vehicle, the data including at least one slope and one turn at each position of the vehicle in motion;

said accelerometer configured to provide a measurement of a total acceleration of the vehicle in the longitudinal direction; and a computer configured to process data of the profile of the trajectory and the total acceleration measured by said accelerometer in order to determine a corrected acceleration in a longitudinal direction of effective movement of the vehicle for which the effects of slope and turn are taken into account.

2. The device according to claim 1, comprising:

a detector of adhesion loss of at least one of the two axles;

said detector of adhesion loss being coupled to output signals of each of said tachometers;

each output signal providing a measurement of instantaneous angular speed of the respectively associated axle.

3. The device according to claim 2, wherein said detector of adhesion loss comprises an indicator of two modes of detection of adhesion loss which may be combined, according to which a variation of instantaneous angular speed of at least one of the output signals is detected or/and a difference between the angular speeds of each output signal is detected.

4. The device according to claim 3, wherein said computer comprises:

a primary computer having signal inputs for receiving the data of the profile of the trajectory and for the measured acceleration, and a signal output for the corrected acceleration; and a secondary computer having a signal input for an indicator for detecting adhesion loss from said detector of adhesion loss;

said secondary computer having outputs for supplying an estimated speed and an estimated position of the vehicle;

said secondary computer having inputs for the signals of said tachometers to estimate the speed and the position of the vehicle;

said secondary computer having a signal input for receiving the corrected acceleration from said primary computer in order to re-estimate the speed and the position of the vehicle at least during an adhesion loss for which a previously estimated value of the speed is transmitted from said secondary computer to said primary computer to carry out a re-estimation of the corrected acceleration.

5. The device according to claim 4, wherein, prior to a detection of adhesion loss, said secondary computer supplies the speed and the position of the vehicle by way of dynamic parameters associated with a rotation of at least one of the axles of the vehicle.

6. The device according to claim 5, wherein, during an adhesion loss, said secondary computer supplies the speed to the primary computer, said primary computer supplying in return an acceleration to said secondary computer.

7. The device according to claim 3, wherein:
the corrected acceleration is a sum of the total measured acceleration, the acceleration under the effect of slope, and the acceleration under the effect of turn;
the acceleration under the effect of slope is proportional to gravity; and
the acceleration under the effect of turn is a product of:
  a) a sine of an instantaneous angle of which an apex lies at a center of curvature and of which the sides pass through a center of the vehicle and through said accelerometer; and
  b) the speed squared and divided by a sum of a radius of the curvature and a lateral distance of the accelerometer relative to the center of the vehicle;
the instantaneous angle is approximated by a longitudinal distance of the accelerometer relative to the center of the vehicle divided by the sum of the radius of curvature and the lateral distance of the accelerometer relative to the center of the vehicle; and
the longitudinal distance is positive or negative according to whether said accelerometer is disposed forward or rearward of the vehicle in the direction of movement and the lateral distance is positive or negative according to whether the accelerometer is disposed outside or inside a curve relative to the turn.

8. The device according to claim 3, wherein said accelerometer comprises a plurality of separate measurement axes.

9. The device according to claim 8, wherein said separate measurement axes are configured to refine a determination of the corrected acceleration and/or to compensate for a loss of information from the system for measuring position, providing odometric data.

10. The device according to claim 1, wherein said accelerometer is a single measurement axis accelerometer having only one measurement axis, and that one measurement axis is the measurement axis in the longitudinal direction of the main movement of the vehicle.

* * * * *